United States Patent [19]

Cowen et al.

[11] Patent Number: 4,816,938

[45] Date of Patent: Mar. 28, 1989

[54] PROCESS FOR DETERMINING DATA DISK TRACK CENTERS

[75] Inventors: Stephen R. Cowen, Longmont, Colo.; James S. Toreson, Zephyr Cove; Joseph Y. Chen, Carson City, both of Nev.; David S. Cochran, Los Altos, Calif.

[73] Assignee: Xebec, Carson City, Nev.

[21] Appl. No.: 77,588

[22] Filed: Jul. 24, 1987

Related U.S. Application Data

[63] Continuation-in-part of Ser. No. 896,318, Jun. 2, 1986, abandoned.

[51] Int. Cl.[4] .......................... G11B 5/54; G11B 5/56; G11B 21/10
[52] U.S. Cl. ............................. 360/75; 360/77.08; 360/78.13
[58] Field of Search ..................... 360/75, 77, 78; 318/685, 696

[56] References Cited

U.S. PATENT DOCUMENTS 4,122,503 10/1978 Allan ..................................... 360/78
4,445,153 4/1984 Fujimoto et al. ..................... 360/77
4,499,510 2/1985 Harding et al. ...................... 360/77
4,563,713 1/1986 Cahoon et al. ...................... 360/75
4,581,567 4/1986 Yanagawa et al. .................. 360/75
4,620,244 10/1986 Krause ................................. 360/77

OTHER PUBLICATIONS

IBM TDB, vol. 19, No. 6, "Self-Calibrating Disk Storage Apparatus", Griffiths et al., 11/76, pp. 1991–1992.

Primary Examiner—Raymond F. Cardillo
Assistant Examiner—Steven R. Garland
Attorney, Agent, or Firm—Thomas E. Schatzel

[57] ABSTRACT

A process for determining the center of data disk tracks. The transducer head is positioned to one side of a track. The head repeatedly reads the track and microsteps across the track. The number of microsteps taken at the position on each side of the center of the track where a certain number of error correction code errors occur, are designated as boundaries of that track. The center of the track is then calculated as being half-way between the boundaries. By using the microstep off-sets for the centers of two tracks on a data disk, a correction factor can be calculated to compensate for thermal expansion of the data disk.

12 Claims, 5 Drawing Sheets

PROCESS FOR DETERMINING DATA DISK TRACK CENTERS

This is a continuation-in-part of co-pending application Ser. No. 06/869,318 filed on June 2, 1986 now abandoned.

BACKGROUND OF THE INVENTION

1. Field of the Invention

This invention relates generally to data disk drive systems and more particularly to a process for determining the center of a data disk track.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is encoded upon, or retrieved from, the face of the disk by a movable magnetic transducer device called a read/write head. The binary information is encoded on the face of the disk in concentric rings, called tracks, and the read/write head can move radially along the disk face to select a particular track to record or retrieve information.

These magnetic recording hard disks typically have track densities of about 1,000 tracks per inch of radius of the disk. Because of the high density, precise positioning of the read/write head is necessary so that the head can accurately gain access to a particular desired track on the surface of the disk.

A problem in exactly positioning the head over the desired track arises due to thermal expansion. The data disks are designed to operate in a temperature range of five degrees Celsius (5° C.) to fifty degrees Celsius (50° C.). In operation, the disk drives heat up rapidly once they have been turned on. It is conceivable that a data disk drive could be initially turned on and the disk formatted at five degrees Celsius (5° C.) and later that day the disk could be operating at fifty degrees Celsius (50° C.). The increased temperature causes the disk to expand and the data disk tracks are offset. The transducer head cannot be exactly positioned over the tracks to be read or written upon and errors result.

The expansion of the disk need not be great to cause problems when the data track widths are only one thousand microinches. As the track densities become greater in order to increase the storage capacity, thermal expansion becomes more of a problem.

Prior art processes have been developed to compensate for thermal expansion. Quantum makes a device called Servo-wedge which has thermal expansion compensation. The Servo-wedge data disk is encoded with factory written servo bursts between the data tracks of surface three of one of the data disks. The tracks on the data disks are divided into eight zones. When thermal compensation is needed for a particular zone, the heads are positioned in the zone, and head 3 is instructed to read the servo bursts from surface 3. If the frequency from the burst on one side shows greater than the frequency from the burst on the other side, then the controller instructs the head to move away from the stronger side toward the weaker side. The thermal offset for each zone is stored for future use.

NEC also has a thermal compensation technique. The disks are divided into five zones. Two consecutive tracks in the middle of each zone are designated as representative tracks. These tracks have servo information written in the area immediately following the index. When thermal compensation is needed, the head seeks the representative tracks in a zone. The tracks are read and the head is microstepped until the servo information read is equal to the servo information stored in the microprocessor. Another method is disclosed by U.S. Pat. No. 4,499,510 by Philip Harding and Leonard Schupak. In this method a flexible or floppy disk with ninety-six tracks per inch is used. The head is positioned near the first data track and microstepped across the track. The error correction code is checked at each microstep. When no errors are first detected, the prior microstep is labelled "L". When a first error is again detected, the microstep is labelled "H". The track center is calculated as being midway between L and H and is called "M". This operation is then repeated on all subsequent data tracks. Thus, the entire disk must be microstepped across whenever there is need to correct for thermal expansion.

Although the Harding, et al. method works for floppy disks, it does not work with hard disks. Hard disks have track densities of one thousand tracks per inch compared to the ninety-six tracks per inch for a floppy disk. The Harding, et al. method is not accurate enough to be used at these higher track densities. Also, the method of microstepping across each track, while possible for an eighty track floppy disk, is too time consuming for a one thousand track hard disk.

SUMMARY OF THE INVENTION

It is an object of the present invention to provide a process for accurately and efficiently compensating for thermal expansion of a data disk.

It is another object of the present invention to provide a process for accurately and efficiently locating the center of a data disk track.

Briefly, a preferred embodiment of the present invention provides a process for compensating for thermal expansion of a data disk comprising the steps of: (a) seeking the outside target track; (b) reading the outside target track and determining the number of error correction code sector errors detected; (c) taking a microstep toward the center of the track; (d) repeating steps (b) and (c) until a predetermined number of sector errors is detected at a certain microstep position; (e) designating the number of microsteps taken as a first boundary of the outside target track; (f) continuing to microstep and read across the outside target track until the number of sector errors detected is increasing and a certain predetermined number of sector errors is detected; (g) designating the number of microsteps taken as a second boundary of the outside target track; (h) calculating the center of the outside target track using the first and second boundary of the outside target track; (i) repeating steps (a) through (h) for the inside target track; and (j) calculating a correction factor using the calculated positions of the centers of the outside and inside target tracks.

It is an advantage of the present invention that it provides a process for accurately and efficiently compensating for thermal expansion of a data disk.

It is another advantage of the present invention that it provides a process for accurately and efficiently locating the center of a data disk track.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

Figure 1:
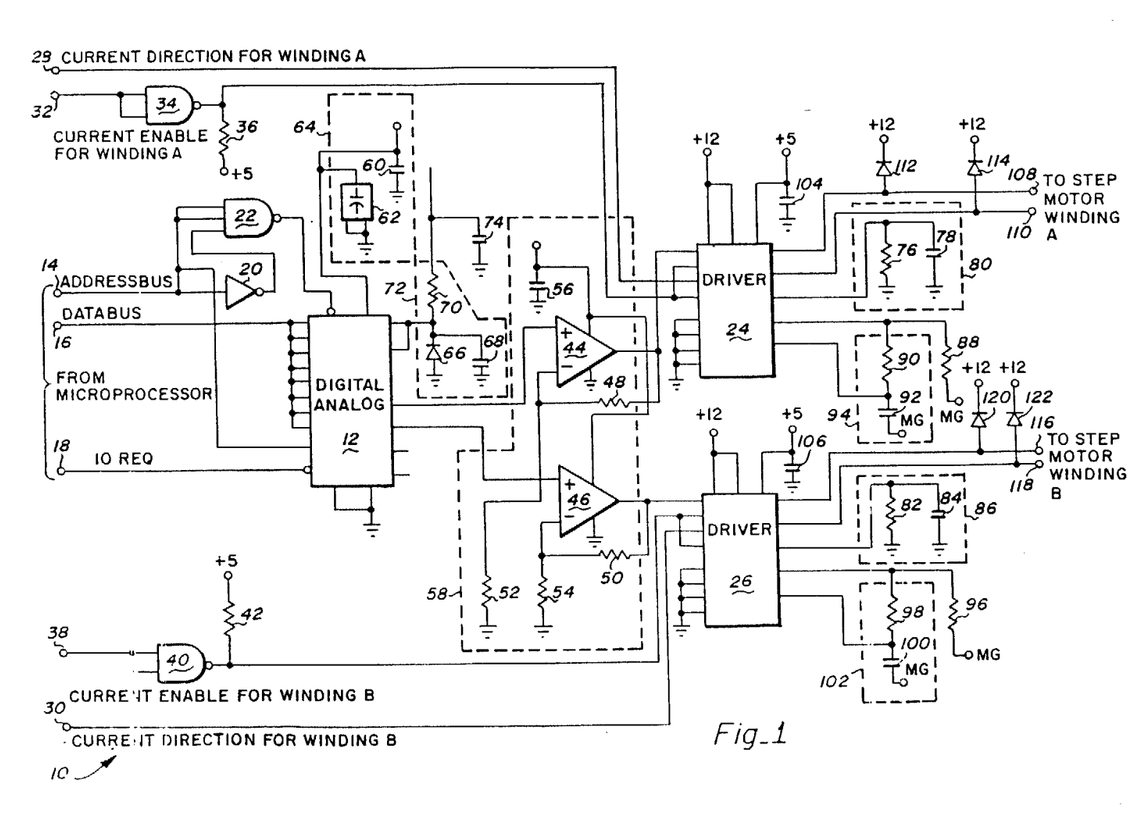
FIG. 1 is a circuit diagram of a step motor in accordance with the present invention.

FIG. 1 shows a circuit diagram for the step motor circuitry of the present invention and is referred to by the general reference number 10. A digital analog converter 12 is connected to a microprocessor via an address bus 14, a data bus 16 and data line 18. Data line 18 provides latching for data bits into digital analog converter 12. A NOT gate 20 and a NAND gate 22 are connected intermediate the address bus 14 and digital analog converter 12. The address bus 14 provides clocking information for the data bits on data bus 16 and determines which of the two motor windings the information is sent for.

Digital analog converter 12 feeds an analog input to a first driver chip 24 and a second driver chip 26. Driver chips 24 and 26 are 3770 integrated stepping motor driver chips such as RIFA. Driver 24 controls the direction and amount of current flowing through winding A of a stepper motor. Driver 26 controls the direction and amount of current flow through winding B of a stepper motor. Current for winding A is provided by a line 28 and current for winding B is provided by a line 30. By varying the current amount and direction, drivers 24 and 26 are able to control the motor to take microsteps. Microsteps are steps which are smaller than the distance between tracks on a data disk. There are typically thirty-two microsteps between each track.

A current enable line 32 for winding A connects the microprocessor to the driver 24. A NAND gate 34 and pull-up resistor 36 are connected intermediate the microprocessor and driver 24. A current enable line 38 for winding B connects the microprocessor to the driver 26. A NAND gate 40 and a pull-up resistor 42 are connected intermediate the microprocessor and driver 26. Current enable lines 32 and 38 allow the microprocessor to control the flow of current to the motor upon startup and prevent overheating and burn-out of the windings.

A first amplifier 44, a second amplifier 46, a resistor 48, a resistor 50, a resistor 52, a resistor 54 and a capacitor 56 form a voltage gain circuit 58. Voltage gain circuit 58 is connected intermediate digital analog converter 12 and drivers 24 and 26. Circuit 58 amplifies the voltage output of digital analog converter 12 and brings it up to the voltage range of the inputs for drivers 24 and 26.

A capacitor 60 and a capacitor 62 form a noise suppression circuit 64 for digital analog converter 12. A diode 66, a capacitor 68 and a resistor 70 form a voltage reference circuit 72. Voltage reference circuit 72 is connected to digital analog converter 12. A capacitor 74 is connected to voltage reference circuit 72 to provide noise suppression.

A resistor 76 and a capacitor 78 form a circuit 80 which provides off period control of the current chopping frequency and is connected to driver 24. A resistor 82 and a capacitor 84 form a second current chopping and frequency control circuit 86 which is connected to driver 26. A current sense resistor 88 is connected to driver 24.

A resistor 90 and a capacitor 92 form a circuit 94. Circuit 94 is connected to driver 24 and provides a low pass filter to stop inductive spikes from resistor 88 from giving driver 24 false results. A current sense resistor 96 is connected to driver 26. A resistor 98 and a capacitor 100 form a low pass filter circuit 102 which is connected to driver 26. A capacitor 104 and a capacitor 106 are connected to driver 24 and 26, respectively, to provide noise suppression.

Driver 24 provides current to winding A via lines 108 and 110. Diodes 112 and 114 provide voltage suppression for the voltage surges in the windings which occur when the current flow is reversed or terminated. Driver 26 provides current flow to winding B via lines 116 and 118. Diodes 120 and 122 provide voltage suppression.

In the preferred embodiment, the step motor 10 is used in a hard disk drive system. The hard magnetic disks typically have about one thousand tracks per inch of radius of the disk and are divided into thirty-two sectors per track. Each surface of each disk has two target tracks, an outside guard band and an inside guard band. Typically, the outside guard band is the outermost track and the inside guard band is the innermost track. Both guard bands are recorded with a fixed data pattern such that data in each of their thirty-two sectors are identical. Regular data tracks are recorded between the guard bands.

Figure 2A:
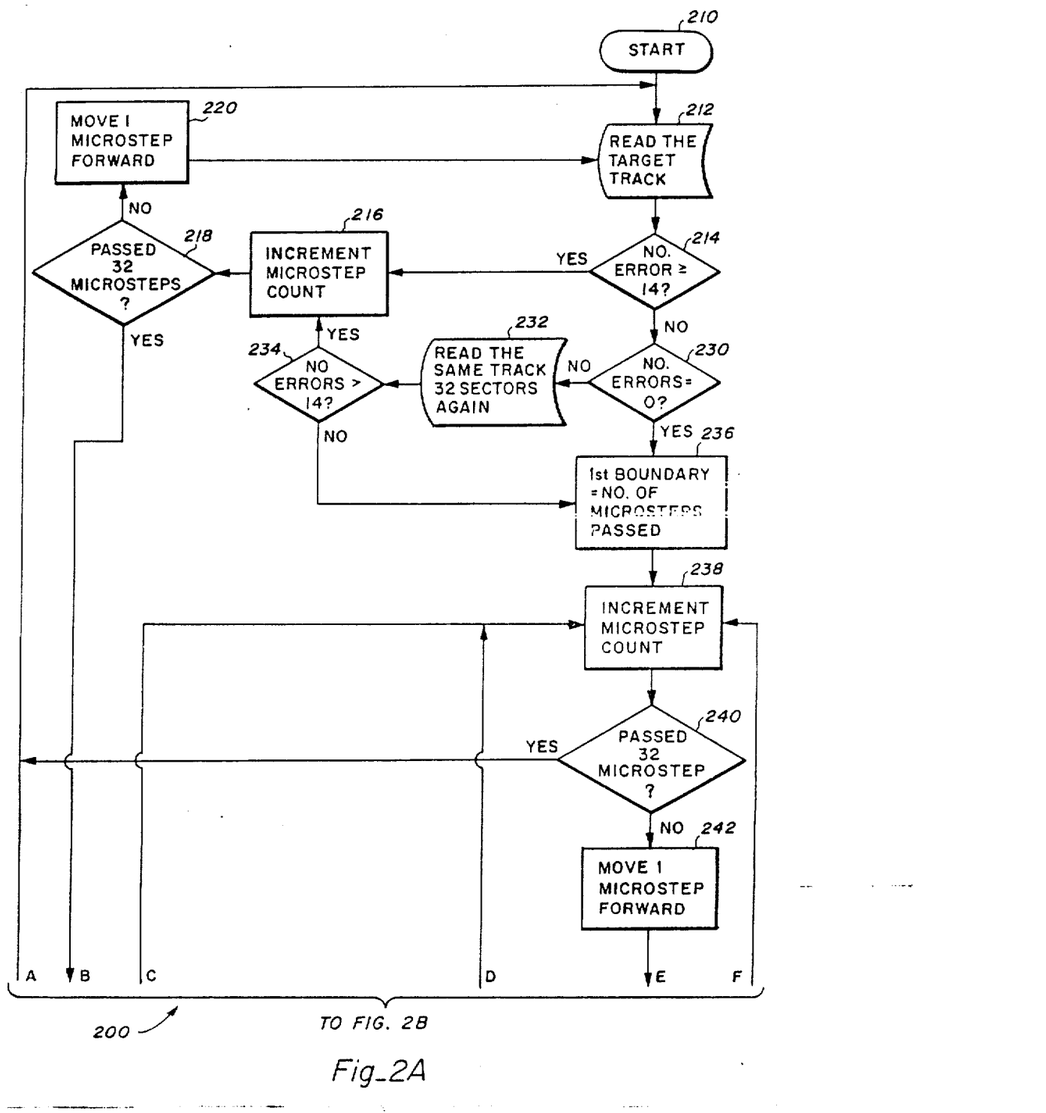
FIGS. 2A and 2B comprise a flow chart of the process for determining the center of a data track in accordance with the present invention.
Figure 2B:
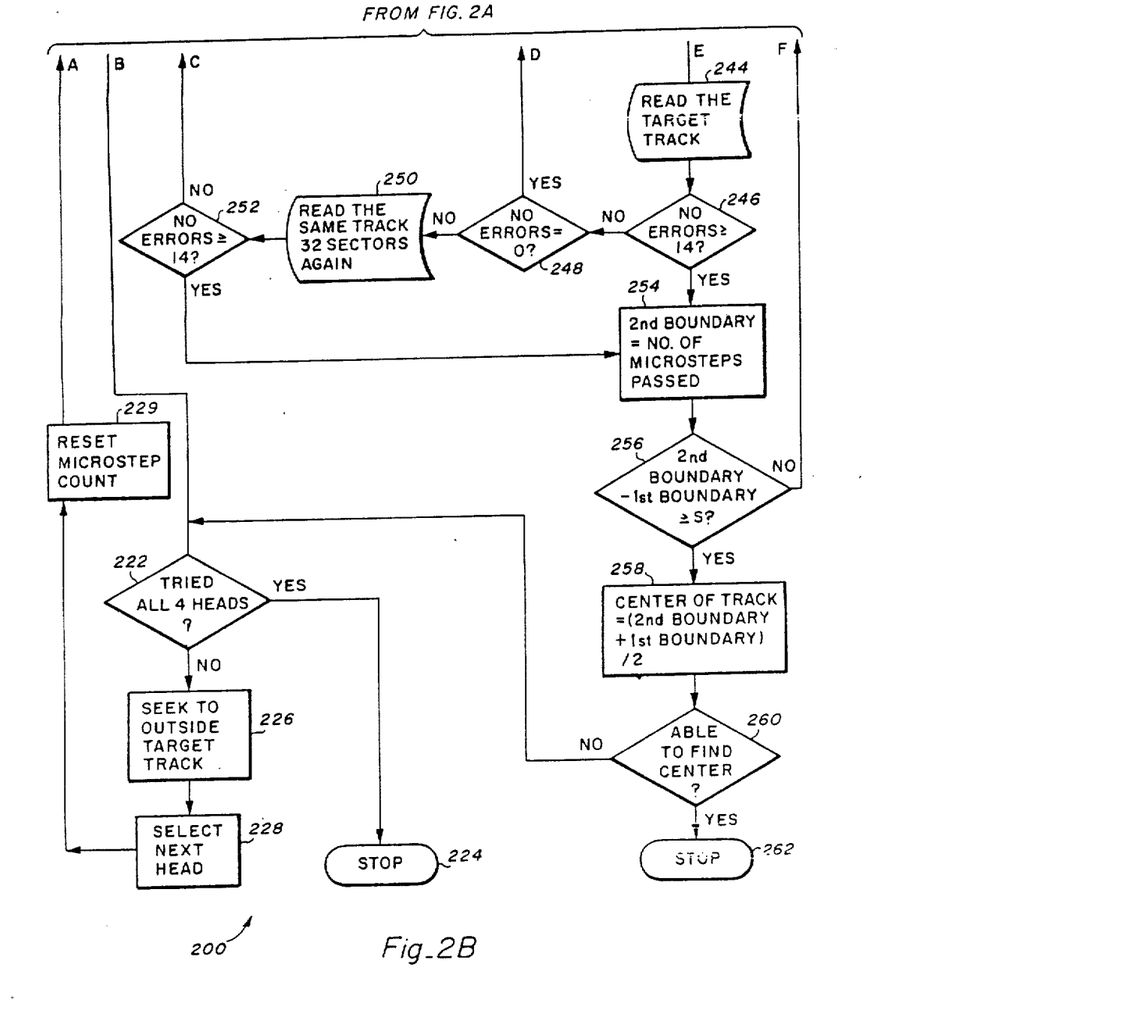

FIGS. 2A and 2B show a flow chart of the process for determining the center of a data track in accordance with the present invention and is referred to by the general reference number 200.

After a start step 210, the transducer head is instructed to read the target track at a step 212. The amount of error correction code errors is then determined at a step 214. If errors are detected in fourteen or more of the thirty-two sectors, the microstep count is incremented at a step 216. The number of sectors in which errors are detected will be referred to as sector errors. The number of microsteps already taken is then determined at a step 218. If thirty-two microsteps have not already been taken, the stepper motor is instructed to move the transducer head forward one microstep at a step 220 and the target track is read again at step 212.

Thirty-two microsteps represent the maximum distance the head can travel between two tracks. If the head has traveled thirty-two microsteps at step 218 and there are still fourteen or more sectors with errors detected, then there is something wrong. The number of transducer heads already tried is then determined at a step 222. If all four heads have already been tried, then the process comes to a stop step 224, so that the problem can be rectified before proceeding further. If all four heads have not already been tried, then the stepper motor is instructed to go back to the beginning position outside the target track at a step 226. The next head is then used at a step 228, the microstep count is reset at a step 229, and the target track is read again at step 212.

Returning now to step 214. If the number of sector errors detected is less than fourteen, then the process proceeds to determine if the number of errors is equal to zero at a step 230. If the number of errors is not equal to zero, then the head is instructed to read all thirty-two sectors of the same track again at a step 232. The number of errors detected is then determined at a step 234. If the number of sector errors is now greater than fourteen, then the process goes to step 216 as described above. If the number of sector errors is fourteen or less, then the first boundary of the target track is designated as the number of microsteps already passed at a step 236.

Next, the microstep count is incremented at a step 238. The number of microsteps already taken is determined at a step 240. If more than thirty-two microsteps have been taken, the process goes to step 212 as described above. If thirty-two microsteps have not been taken, then the stepper motor is instructed to move the transducer head one microstep forward at a step 242. The transducer head then reads the target track at a step 244. The number of sector errors detected is then determined at a step 246. If the number of sector errors is less than fourteen, the process then determines if the number of sector errors is equal to zero at a step 248. If the number of sector errors is equal to zero, then the process goes back to step 238. If the number of sector errors is not equal to zero, then the head is instructed to read all thirty-two sectors of the same track again at a step 250.

Next, the number of sector errors is determined at a step 252. If less than fourteen sector errors are detected, then the process returns to step 238. If fourteen or more sector errors are detected, then the second boundary of the track is designated as the number of microsteps already taken at a step 254. Returning to step 246. If the number of sector errors detected was greater than or equal to fourteen, then the process goes directly to step 254.

A step 256 then determines if the difference between the first and second boundaries is greater or equal to five microsteps. If it is, then the process goes to a step 258. If it is not, then something is wrong and the process returns to step 238 to check the second boundary.

At step 258, the center of the target track is determined by calculating half the distance between the first and second boundaries. If a value is obtained, a step 260 instructs the process to stop at step 262. If a value is not found, then the process goes to step 222 to try a different head.

The operation of the process can now be understood. The head is initially positioned on one side of a target track. Then, the head repeatedly reads the track and microsteps across it. As the head moves toward the center of the track, the amount of sector errors detected decreases. A position where a certain number of sector errors is detected, is designated as the first boundary track, fourteen sector errors is preferred.

Next, the head continues to move across the track in the same direction until the number of sector errors detected starts to increase. When a certain number of sector errors is detected, then the position is designated as the second boundary of the track. The center of the track can then be determined by calculating the halfway point between the first and second boundaries.

Figure 3:
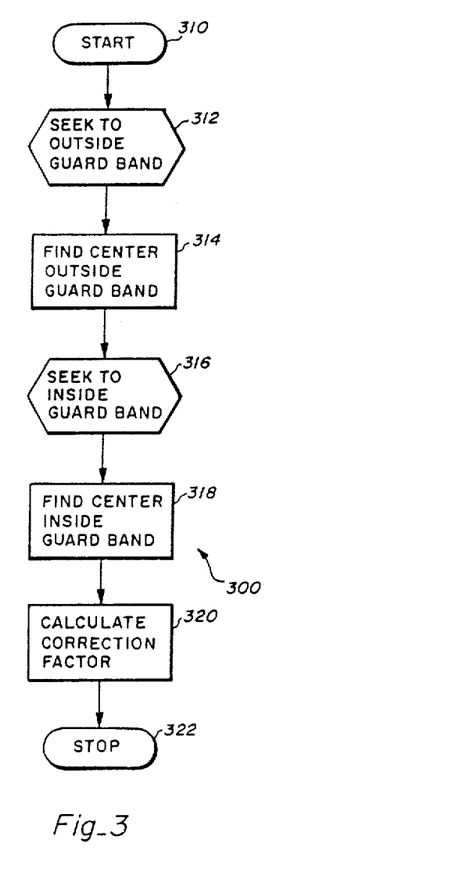
FIG. 3 is a flow chart of the process for determining a thermal correction factor in accordance with the present invention.

FIG. 3 shows a flow chart of the process for determining the thermal correction factor in accordance with the present invention and is designated by the general reference number 300. The process starts at a step 310 and the stepper motor is instructed to seek the outside guard band at a step 312. Outside guard band is the outermost data track. As stated above, in the preferred embodiment, the guard bands are specifically formatted as guard bands. However, regular data tracks could also be used as guard bands. Next, the center of the outside guard band is determined at a step 314 by using the process 200 as illustrated in FIG. 2. The stepper motor is then instructed to seek the inside guard band at a step 316. The center of the inside guard band is determined in a step 318 using the process 200 of FIG. 2.

In a step 320 the correction factor for the thermal expansion is calculated. Due to the linear nature of thermal expansion, the correction factor can be determined by interpolating the correction distances of the centers of the outside and inside guard bands.

For example, the correction factor C for a track number X would be: $C(X) = [(\text{microstep offset of inside guard band} - \text{microstep offset of outside guard band}) * X/\text{total number of tracks}] + \text{microstep offset of outside guard band}$.

In operation, the process would be programmed as firmware into a disk drive system, such as the Diamond II of Xebec Corporation. The stepper motor can be instructed to position the head outside the outside guard band. The stepper motor then microsteps the head toward the center of the disk across the outside guard band until the center of the outside guard band track is determined. The stepper motor then positions the head outside the inside guard band and microsteps toward the center of the disk across the inside guard band until the center of the track is determined. The head approaches the inside track from the same direction as the outside track in order to void mechanical hysteresis. The process could also start with the inside guard band and then go to the outside guard band. In this case, the head would microstep radially outward.

A thermal expansion correction factor is then calculated using the measured microstep off-sets of the outer and inner guard bands. When the temperature of the disk is the same as the temperature when the disk was originally written, there will be no need for a correction factor. When the disk heats up and expands, the off-set for the outside guard band will be greater than the off-set for the inner guard band. The process of the present invention will determine a correction factor. The factor is then applied to add the required number of microsteps in order to center the head over the desired data track. The correction factor can be calculated at predetermined time intervals or in the event of an uncorrectible data error.

Figures 4A, 4B:
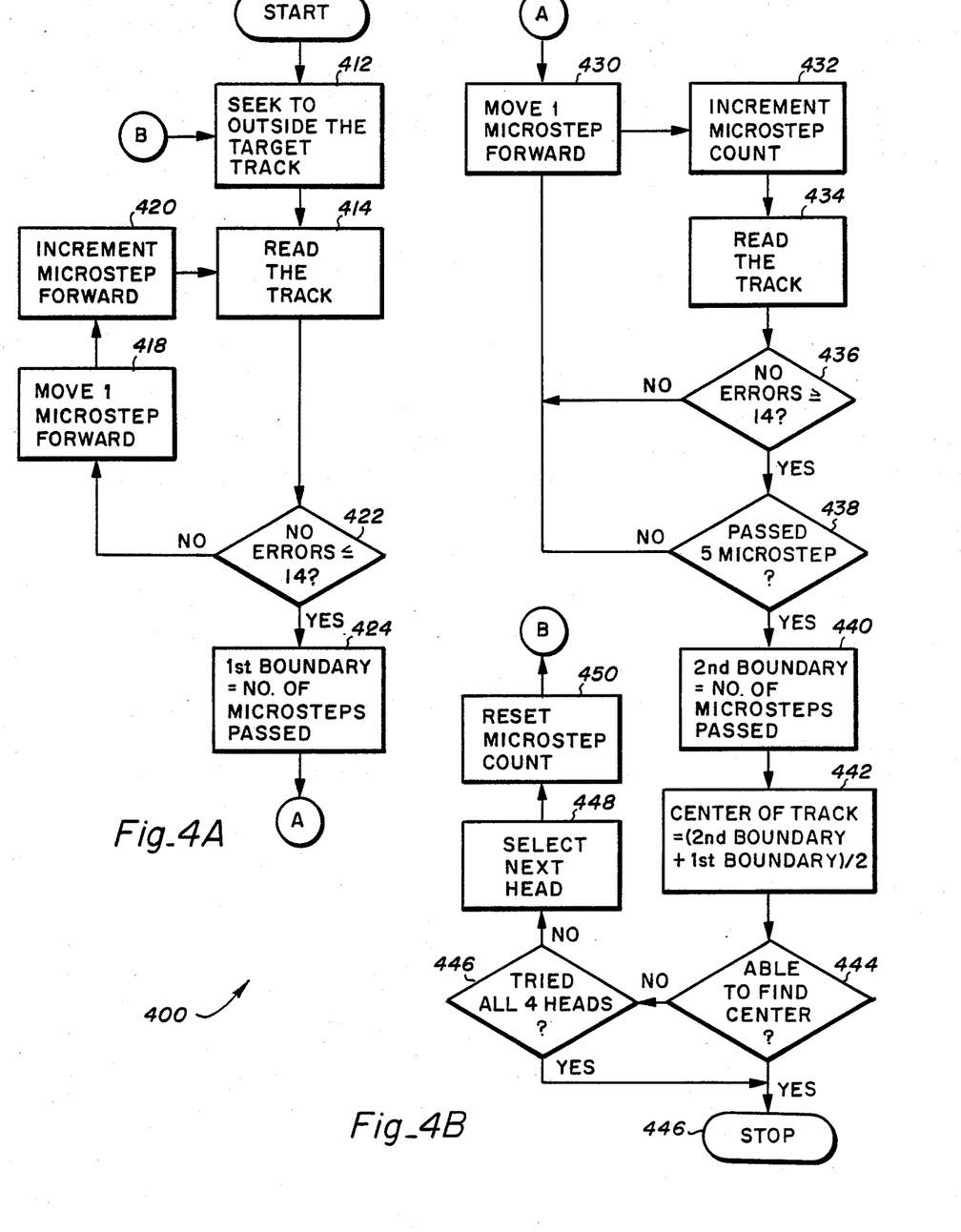
FIGS. 4A and 4B comprise a flow chart of an alternative process for determining the center of a data track in accordance with the present invention.

FIG. 4 shows an alternative process for determining the center of a data track in accordance with the present invention is referred to by the general reference number 400.

After a start step 410, the transducer head is instructed to seek to the outside of a target track at a step 412. At a step 414, the head reads the track. The amount of error correction code sector errors is determined at a step 422. If the number of sector errors is greater than fourteen, the head is moved one microstep forward at step 418. If the number of sector errors detected is less than or equal to fourteen, then the first boundary of target track is designated as the number of microsteps already passed at a step 424. Fourteen sector errors have been selected as representing the outside boundaries of the target track, however, as explained below, a different quantity of errors may be selected to represent the boundaries.

Next, the head is moved one microstep forward at a step 430. The microstep count is incremented at a step 432. The track is read at a step 434. The number of error correction code sector errors is detected at a step 436. If the number of sector errors is not greater or equal to fourteen, then the process returns to step 430. If the number of errors detected is greater or equal to fourteen, then the process goes to a step 438.

At step 438, if the number of microsteps taken is not five, then the process returns to step 430. If five microsteps have been taken, then the second boundary is designated as the number of microsteps already passed at a step 440. Fourteen sector errors has been selected as representing the second boundary, however, a different quantity of sector errors may be selected to represent boundaries. Five microsteps have been arbitrarily designated as the minimum data band width. This number will vary depending upon the number of error correction code sector erros designated as the outer boundaries.

The process goes to a step 442. The center of the target track is calculated as the difference between the value of the first and second boundaries divided by two. At a step 444 it is determined if a value for step 442 has been obtained. If it has, the process stops at a step 446. If no value has been obtained, the process determines if all four transducer heads have already been used. If they have, the process stops at step 446. If they have not, then a new head is selected at a step 448, the microstep count is reset at a step 450 and the process returns to step 412.

The advantages of the invention may now be understood. A high degree of accuracy in determining the boundary of the target tracks is achieved. This high edge acuity of the boundary is possible when a relatively high ratio of sector errors is used as the definition of the boundary. In this case, a ratio of fourteen to thirty-two sectors is ideal, although ratios of between 0.35 and 0.50 could also be used.

Prior art systems which define the boundary as the position where the first error is detected are not nearly as accurate. There is a great deal of randomness as to the position where the first error is detected. This is due to disk eccentricities, high noise-to-signal ratios, and other factors. Variations of as much as three to four microsteps are possible. These rough approximations of track boundaries are just not accurate enough for hard disk applications.

In contrast, by defining the boundaries by using the high ratios of sector errors to total number of sectors, as described in the present invention, accuracies of about 1/10th of a microstep are possible. Thus, this method is applicable to the high density applications involved in hard disk drive systems. This accuracy is possible because by defining the boundaries at these higher ratios, it has been observed that there is a much narrower band of variation in the location of the boundary.

Another reason for the improved accuracy of the present invention is due to the use of special target tracks which have been encoded with identical data patterns on each sector. These identical patterns further help to increase the accuracy of detecting a track boundary by eliminating another source of randomness in the error detection process.

The present invention also has other applications beside track center detection and thermal expansion correction. By measuring the track boundaries, a measurement for the track width is possible. The track width can be a good test for identifying bad disks. A narrow track width will cause the disk to have a high signal-to-noise ratio and could indicate a bad disk. Another test could use the present invention as a test for defects in the disk drive system. Each disk drive system which is manufactured could be subjected to a thermal expansion test as described in this invention. If the disk expanded greater than a predetermined limit during the test operation, it would show that the disk drive system is overheating and may be defective.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A process for determining data disk track centers comprising the steps of:
    (a) seeking a target track;
    (b) repeatedly reading said target track and microstepping the transducer head in a direction across said target track such that a number of error correction code sector errors detected is decreasing;
    (c) upon reading a predetermined number of error correction code sector errors, designating the number of microsteps taken as a first boundary of the target track;
    (d) repeatedly reading said target track and microstepping the transducer head across said target track in the same direction as step (b) such that the number of error correction code sector errors detected increases eventually;
    (e) upon reading a predetermined number of error correction code section errors, designating the number of microsteps taken as a second boundary of said target track;
    (f) calculating the value for the target track center by interpolating between the number of microsteps taken at said first boundary and at said second boundary;
    (g) after each time a target track is read, checking the number of microsteps the transducer head has already taken across the target track; and
    (h) if a number of microsteps approximately equal to a distance between two data tracks has already been taken, repeating the entire process with a different transducer head.

2. A process for determining data disk track centers comprising the steps of:
    (a) seeking a target track;
    (b) repeatedly reading said target track and microstepping the transducer head in a direction across said target track such that a number of error correction code sector errors detected is decreasing;
    (c) upon reading a predetermined number of error correction code sector errors, designating the number of microsteps taken as a first boundary of the target track;
    (d) repeatedly reading said target track and microstepping the transducer head across said target track in the same direction as step (b) such that the number of error correction code sector errors detected increases eventually;

(e) upon reading a predetermined number of error correction code section errors, designating the number of microsteps taken as a second boundary of said target track;

(f) calculating the value for the target track center by interpolating between the number of microsteps taken at said first boundary and at said second boundary; and (g) if no value is obtained for the center of the target track, then a different transducer head is used and the process is repeated.

3. A process for determining data disk track centers comprising the steps of:

(a) encoding an identical data pattern on each sector of a target track;

(b) seeking said target track;

(c) repeatedly reading said target track and microstepping the transducer head in a direction across said target track such that a number of error correction code sector errors detected is decreasing;

(d) upon reading a predetermined number of error correction code sector errors, designating the number of microsteps taken as a first boundary of said target track;

(e) repeatedly reading said target track and microstepping the transducer head across said target track in the same direction as step (c) such that the number of error correction code sector errors detected increases eventually;

(f) upon reading a predetermined number of error correction code sector errors, designating the number of microsteps taken as a second boundary of said target track;

(g) after each time said target track is read, checking the number of microsteps the transducer head has already taken across the target track and if a number of microsteps approximately equal to a distance between two data tracks has already been taken, repeating the entire process with a different transducer head; and (h) calculating a value for the target track center by interpolating between the number of microsteps taken at said first boundary and at said second boundary.

4. A process for determining data disk track centers comprising the steps of:

(a) encoding an identical data pattern on each sector of a target track;

(b) seeking said target track;

(c) repeatedly reading said target track and microstepping the transducer head in a direction across said target track such that a number of error correction code sector errors detected is decreasing;

(d) upon reading a predetermined number of error correction code sector errors, designating the number of microsteps taken as a first boundary of said target track;

(e) repeatedly reading said target track and microstepping the transducer head across said target track in the same direction as step (c) such that the number of error correction code sector errors detected increases eventually;

(f) upon reading a predetermined number of error correction code sector errors, designating the number of microsteps taken as a second boundary of said target track;

(g) calculating a value for the target track center by interpolating between the number of microsteps taken at said first boundary and at said second boundary; and (h) if no value is obtained for the center of said target track, then using a different transducer head and repeating the process.

5. A process for compensating for thermal expansion of a data disk comprising the steps of:

(a) seeking a first target track;

(b) repeatedly reading said first target track and microstepping the transducer head in a direction across said target track such that a number of error correction code sector errors detected is decreasing;

(c) upon detecting a predetermined number of error correction code sector errors, designating the number of microsteps taken as a first boundary of said first target track;

(d) repeatedly reading said first target track and microstepping the transducer head across the target track in the same direction as step (b) such that the number of error correction code sector errors detected increases eventually;

(e) upon detecting a predetermined number of error correction code sector errors, designating the number of microsteps taken as a second boundary of said first target track;

(f) calculating a value for the first target track center by interpolating between the number of microsteps taken at said first boundary and at said second boundary of said first target track;

(g) seeking a second target track;

(h) repeatedly reading said second target track and microstepping the transducer head in a direction across said second target track such that a number of error correction code sector errors detected is decreasing;

(i) upon detecting a predetermined number of error correction code sector errors, designating the number of microsteps taken as a first boundary of said second target track;

(j) repeatedly reading said second target track and microstepping the transducer head across said second target track in the same direction as step (h) such that the number of error correction code sector errors detected increases eventually;

(k) upon detecting a predetermined number of error correction code sector errors, designating the number of microsteps taken as a second boundary of said second target track;

(l) calculating a value for the second target track center by interpolating between the number of microsteps taken at said first boundary and said second boundary of said second target track;

(m) calculating a thermal expansion correction factor and then using said thermal expansion correction factor to calculate positions of data tracks; and (n) after each time a target track is read, checking the number of microsteps the transducer head has already taken across the target track, and if a number of microsteps approximately equal to a distance between two data tracks has already been taken across one target track, then a new transducer head is used and the process is repeated for that particular target track.

6. A process for compensating for thermal expansion of a data disk comprising the steps of:

(a) seeking a first target track;

(b) repeatedly reading said first target track and microstepping the transducer head in a direction across said target track such that a number of error correction code sector errors detected is decreasing;

(c) upon detecting a predetermined number of error correction code sector errors, designating the number of microsteps taken as a first boundary of said first target track;

(d) repeatedly reading said first target track and microstepping the transducer head across the target track in the same direction as step (b) such that the number of error correction code sector errors detected increases eventually;

(e) upon detecting a predetermined number of error correction code sector errors, designating the number of microsteps taken as a second boundary of said first target track;

(f) calculating a value for the first target track center by interpolating between the number of microsteps taken at said first boundary and at said second boundary of said first target track;

(g) seeking a second target track;

(h) repeatedly reading said second target track and microstepping the transducer head in a direction across said second target track such that a number of error correction code sector errors detected is decreasing;

(i) upon detecting a predetermined number of error correction code sector errors, designating the number of microsteps taken as a first boundary of said second target track;

(j) repeatedly reading said second target track and microstepping the transducer head across said second target track in the same direction as step (h) such that the number of error correction code sector errors detected is increasing;

(k) upon detecting a predetermined number of error correction code sector errors, designating the number of microsteps taken as a second boundary of said second target track;

(l) calculating a value for the second target track center by interpolating between the number of microsteps taken at said first boundary and at said second boundary of said second target track;

(m) calculating a thermal expansion correction factor and then using said thermal expansion correction factor to calculate positions of data tracks; and (n) if no value is obtained for the center of the first or second track, then using a different transducer head and repeating the process for that particular target track.

7. A process for determining data disk track centers on a disk comprising the steps of:

(a) designating a sector error number equal to a value of between 0.35 and 0.50 of the total number of sectors per track for a track having more than three sectors;

(b) seeking a first target track;

(c) repeatedly reading said target track and microstepping the transducer head in a direction across said first target track such that a number of error correction code sector errors detected is decreasing;

(d) upon detecting a number of error correction code sector errors equal to said sector error number, designating the number of microsteps taken as a first boundary of said first target track;

(e) repeatedly reading said first target track and microstepping the transducer head across said first target track in the same direction as step (c) such that the number of error correction code sector errors detected increases eventually;

(f) upon detecting a number of error correction code sector errors equal to said sector error number, designating the number of microsteps taken as a second boundary of said first target track; and (g) calculating a value for said first target track center by interpolating between the number of microsteps taken at said first boundary and at said second boundary of said first target track.

8. The process of claim 7 wherein, the disk has thirty-two sectors and the sector error number is fourteen.

9. The process of claim 7 further including the step of:
encoding an identical data pattern on each sector of said first target track such that randomness in sector error detection due to data variations is eliminated.

10. The process of claim 7, in addition to the following steps, for compensating for thermal expansion of a data disk, (h) seeking a second target track;

(i) repeatedly reading said second target track and microstepping the transducer head in a direction across said second target track such that a number of error correction code sector errors detected is decreasing;

(j) upon detecting a number of error correction code sector errors equal to said sector error number, designating the number of microsteps taken as a first boundary of said second target track;

(k) repeatedly reading said second target track and microstepping the transducer head across said second target track in the same direction as step (i) such that the number of error correction code sector errors detected increases eventually;

(l) upon detecting a number of error correction code sector errors equal to said sector error number, designating the number of microsteps taken as a second boundary of said second target track;

(m) calculating a value for the second target track center by interpolating between the number of microsteps taken at said first boundary and at said second boundary of said second target track; and (n) calculating a thermal expansion correction factor and then using said thermal expansion correction factor to calculate positions of data tracks.

11. The process of claim 10 wherein, the disk has thirty-two sectors and the sector error number is fourteen.

12. The process of claim 10 further including the step of:
encoding said first and said second target tracks such that each target track has an identical data pattern in each sector such that the randomness in sector error detection due to data variations is eliminated.

* * * * *

UNITED STATES PATENT AND TRADEMARK OFFICE
CERTIFICATE OF CORRECTION

PATENT NO. : 4,816,938

DATED : March 28, 1989

INVENTOR(S) : Stephen R. Cowen, et al.

Page 1 of 5

It is certified that error appears in the above-identified patent and that said Letters Patent is hereby corrected as shown below:

The Sheets of Drawings consisting of Figs 1, 2A, 2B and 3, should be added as shown on the attached sheets.

Signed and Sealed this

Twenty-first Day of July, 1992

Attest:

DOUGLAS B. COMER

Attesting Officer

Acting Commissioner of Patents and Trademarks

Fig_1

Fig_2A

Fig_2B

Fig_3